Patented May 14, 1929.

1,713,104

UNITED STATES PATENT OFFICE.

CHARLES J. STROSACKER AND CLARENCE C. SCHWEGLER, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING CHLORACETIC ANHYDRIDE.

No Drawing. Application filed March 15, 1927. Serial No. 175,631.

This invention relates to the manufacture of derivatives of anhydride type from chlor-oxy-organic compounds, and more particularly the manufacture of chloracetic anhydrides; and it is among the objects of the invention to provide a procedure which is efficient and reliable. Other objects and advantages will appear as the description proceeds.

To the accomplishment of the foregoing and related ends, the invention, then, consists of the features hereinafter fully described, and particularly pointed out in the claims, the following description setting forth in detail but a few of the various ways in which the principle of the invention may be applied.

In proceeding in accordance with our invention, a chlor-oxy-organic compound is heated with an organic acid in the presence of a metallic chloride. Various of the metallic chlorides may be used with greater or less effectiveness, for instance aluminum chloride, ferric chloride, zinc chloride, etc., ordinarily the aluminum chloride being much preferable. The particular chlor-oxy compound and organic acid used will depend of course upon the product sought, whether of aliphatic or aromatic type. For making chloracetic anhydrides for instance, a chlor-acetyl compound and a chloracetic acid are employed. It is preferable to apply heat so as to bring up the temperature gradually through the reaction stage, and then finally by raising to distillation temperature the anhydride product may be taken off. Reduced pressure or vacuum may be applied and is advantageous in some conditions.

As an illustration of the process:

Monochloracetic acid in the proportion of one mol is heated up with chloracetyl chloride in about a ten (10) per cent excess of molecular proportion, and in the presence of about one (1) per cent of aluminum chloride. The temperature is raised gradually, and under reduced pressure with a reflux condenser. Hydrochloric goes off and the anhydride product may be finally distilled off at its distillation temperature. The monochloracetic acid product is solid at ordinary temperatures, having a melting point of 46° C.

The reaction occurring may be indicated as:

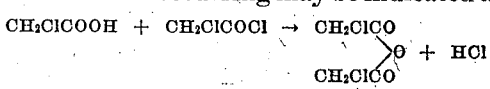

For the preparation of the dichlor-anhydrides, correspondingly dichloracetic acid, and for the preparation of the tri-anhydrides trichloracetic acid, and in each case the corresponding di or tri acetyl chlor compounds, are required. The metallic chloride or aluminum chloride being of catalytic character is required in correspondingly small proportions, ordinarily one (1) per cent being sufficient, and in some cases less may be effectively employed.

It will thus be seen that in accordance with the particular product in view, anhydride-type compounds may be readily prepared.

Other modes of applying the principle of the invention may be employed, change being made as regards the details disclosed, provided the steps stated in any of the following claims, or the equivalent of such, be employed.

We therefore particularly point out and distinctly claim as our invention:—

1. A process of the character described, which comprises heating an acid chloride with an organic carboxylic acid in the presence of a metallic chloride.

2. A process of the character described, which comprises heating an acid chloride with an organic carboxylic acid in the presence of aluminum chloride.

3. A process of the character described, which comprises heating an acid chloride with a chlor-organic carboxylic acid in the presence of a metallic chloride.

4. A process of the character described, which comprises heating an acid chloride with a chlor-organic carboxylic acid in the presence of aluminum chloride.

5. A process of the character described, which comprises heating a chlor-acetyl chloride with a chlor-acetic acid in the presence of a metallic chloride.

6. A process of the character described, which comprises heating a chlor-acetyl chloride with a chlor-acetic acid in the presence of aluminum chloride.

7. A process of the character described, which comprises heating chlor-acetyl chloride with mono-chlor acetic acid in the presence of aluminum chloride.

8. A process of the character described, which comprises heating up mono-chlor acetic acid and a slight molecular excess of chlor-acetyl chloride in the presence of about one (1%) per cent of aluminum chloride.

Signed by us this 7th day of March, 1927.

CHARLES J. STROSACKER.
CLARENCE C. SCHWEGLER.